(12) United States Patent
Ozatay et al.

(10) Patent No.: US 10,495,469 B2
(45) Date of Patent: Dec. 3, 2019

(54) RAPID TRAFFIC PARAMETER ESTIMATION

(71) Applicant: Ford Global Technologies, LLC, Dearborn, MI (US)

(72) Inventors: Engin Ozatay, Ann Arbor, MI (US); Dimitar Petrov Filev, Novi, MI (US); John Ottavio Michelini, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 637 days.

(21) Appl. No.: 14/747,187

(22) Filed: Jun. 23, 2015

(65) Prior Publication Data

US 2016/0379126 A1 Dec. 29, 2016

(51) Int. Cl.
| | | |
|---|---|---|
| *G01C 21/32* | (2006.01) | |
| *G06N 20/00* | (2019.01) | |
| *G06N 5/04* | (2006.01) | |
| *G01C 21/34* | (2006.01) | |
| *G08G 1/0962* | (2006.01) | |
| *G08G 1/0967* | (2006.01) | |

(52) U.S. Cl.
CPC .......... *G01C 21/32* (2013.01); *G01C 21/3492* (2013.01); *G06N 5/04* (2013.01); *G06N 20/00* (2019.01); *G08G 1/0962* (2013.01); *G08G 1/096783* (2013.01)

(58) Field of Classification Search
CPC ......... G06N 99/005; G06N 5/04; G06N 5/046
See application file for complete search history.

(56) References Cited

U.S. PATENT DOCUMENTS

| | | |
|---|---|---|
| 8,478,500 B1 | 7/2013 | Vahidi et al. |
| 8,768,569 B2 | 7/2014 | Kwangjae |
| 8,831,849 B2 | 9/2014 | Joshi |
| 2001/0034575 A1* | 10/2001 | Takenaga ........... B60K 31/0008 701/96 |
| 2005/0197889 A1* | 9/2005 | Prigogin ................ G06Q 30/01 705/7.29 |

(Continued)

FOREIGN PATENT DOCUMENTS

DE 102011083677 A1 4/2013

OTHER PUBLICATIONS

Bousquet, Olivier. "Advanced Lectures on Machine Learning" 2003 [Online] DOwnloaded Sep. 27, 2017 https://link.springer.com/content/pdf/10.1007/b100712.pdf.*

(Continued)

*Primary Examiner* — Ben M Rifkin
(74) *Attorney, Agent, or Firm* — Frank A. MacKenzie; Bejin Bieneman PLC (57) ABSTRACT

Data about vehicle movement at a stoplight are collected. A stoplight cycle time is predicted with a probability model. The data are compared to the predicted stoplight cycle time. A noise function is applied to the data to generate noise-applied data. The probability model for the predicted stoplight cycle time is updated by scaling the probability model with the noise-applied data to generate a new probability model. A recommended vehicle operation is provided via a network to at least one vehicle computer based on the predicted stoplight cycle time determined by the new probability model.

20 Claims, 5 Drawing Sheets

(56) References Cited

U.S. PATENT DOCUMENTS

| | | | |
|---|---|---|---|
| 2011/0037619 A1* | 2/2011 | Ginsberg | G08G 1/095 |
| | | | 340/910 |
| 2013/0253797 A1 | 9/2013 | McNew | |
| 2014/0129121 A1* | 5/2014 | Fino | G01C 21/34 |
| | | | 701/117 |
| 2014/0277986 A1 | 9/2014 | Mahler | |
| 2015/0015421 A1 | 1/2015 | Krijger | |
| 2015/0120175 A1 | 4/2015 | Vahidi et al. | |

OTHER PUBLICATIONS

UK Search Report dated Dec. 14, 2016 (4 pages).

* cited by examiner

RAPID TRAFFIC PARAMETER ESTIMATION

BACKGROUND

In urban driving, stop signs and traffic lights can increase a vehicle's fuel usage. When vehicles are stationary, and/or stop and reaccelerate to a cruising speed, fuel efficiency generally decreases. Unfortunately, roadways generally are not presently configured to allow non-stop traffic flow, or even traffic flow at a generally consistent speed. Therefore, present vehicles are unable to obtain advantages that would flow from fewer stops and starts and/or more consistent cruising speeds.

DETAILED DESCRIPTION

Figure 1:
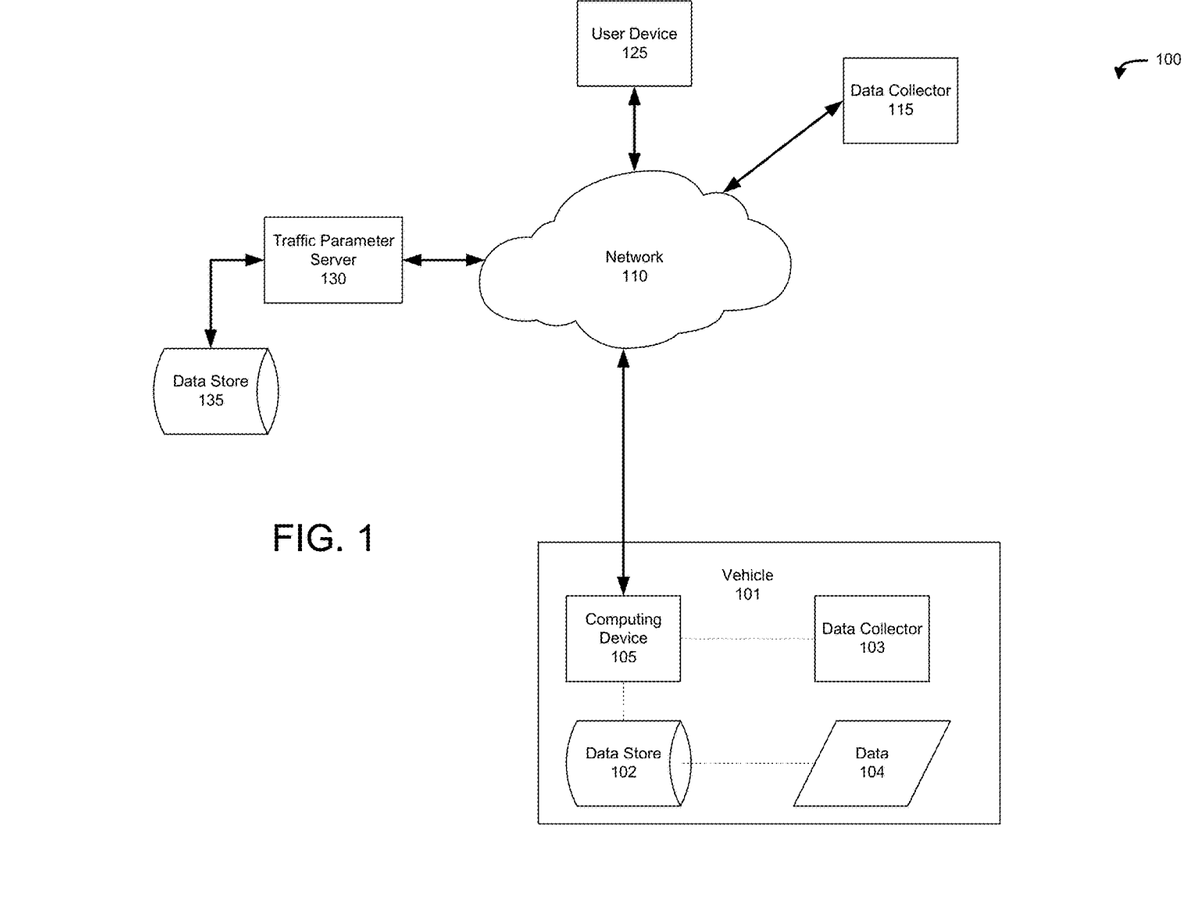
FIG. 1 is a block diagram of a system for estimating and retrieving traffic parameters.

FIG. 1 illustrates a system 100 for efficiently and accurately determining traffic light parameters. Vehicles 101 operated according to such determinations may enjoy benefits including decreased wear and tear, and increased fuel efficiency. In particular, determination of traffic light parameters as disclosed herein, including a stoplight cycle time, can lead to better route construction and better fuel economy by reducing a number of times the vehicle has to stop.

A vehicle 101 includes a computing device 105 having a data store 102 and a data collector 103. The computing device 105 includes a processor and a memory, the memory including one or more forms of computer-readable media, e.g., volatile and/or non-volatile storage as are known, the memory storing instructions executable by the processor for performing various operations, including as disclosed herein. Further, the computing device 105 may include more than one computing device, e.g., controllers or the like included in the vehicle 101 for monitoring and/or controlling various vehicle components, e.g., an engine control unit (ECU), transmission control unit (TCU), etc. The computing device 105 is generally configured for communications on an in-vehicle network and/or communications bus such as a controller area network (CAN) bus or the like. The computing device 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 103. Alternatively or additionally, in cases where the computer 105 actually comprises multiple devices, the CAN bus or the like may be used for communications between devices represented as the computing device 105 in this disclosure.

In addition, the computing device 105 may be configured, e.g., include programming and/or hardware such as is known, for communicating with a network 110, which, as described below, may include various wired and/or wireless networking technologies, e.g., cellular, Bluetooth, wired and/or wireless packet networks, etc. Further, the computing device 105 generally includes instructions for receiving data, e.g., from one or more data collectors 103 and/or a human machine interface (HMI), such as an interactive voice response (IVR) system, a graphical user interface (GUI) including a touchscreen or the like, etc.

Using data received in the computing device 105, e.g., from data collectors 105, data included as stored parameters, the server, etc., the computing device 105 may control various vehicle 101 components and/or operations. For example, the computing device 105 may be used to regulate vehicle 101 speed, acceleration, deceleration, steering, etc.

Data collectors 103 may include a variety of devices. One data collector 103 is shown in FIG. 1 for ease of illustration, but, as will be understood from this disclosure, a vehicle 101 likely will include multiple data collectors 103. For example, various controllers in a vehicle may operate as data collectors 103 to provide data via the CAN bus, e.g., data relating to vehicle speed, acceleration, etc. Further, sensors or the like, global positioning system (GPS) equipment, etc., could be included in a vehicle and configured as data collectors 103 to provide data directly to the computing device 105, e.g., via a wired or wireless connection. Data collectors 103 could also include sensors or the like for detecting conditions outside the vehicle 101, e.g., medium-range and long-range sensors. For example, sensor data collectors 103 could include mechanisms such as radar, lidar, sonar, cameras or other image capture devices, that could be deployed to measure a distance between the vehicle 101 and other vehicles or objects, to detect other vehicles or objects, and/or to detect road conditions, such as curves, potholes, dips, bumps, changes in grade, etc. In addition, data collectors 103 may include sensors internal to the vehicle 101, such as accelerometers, temperature sensors, motion detectors, etc. to detect motion or other conditions of the vehicle 101.

A memory of the computing device 105 generally stores collected data 104. Collected data 104 may include a variety of data collected in a vehicle 101 from data collectors 103. Examples of collected data 104 are provided above, and, moreover, data may additionally include data calculated therefrom in the computing device 105. In general, collected data 104 may include any data that may be gathered by the data collectors 103 and/or computed from such data. Accordingly, collected data 104 could include a variety of data related to vehicle 101 operations and/or performance, as well as data related to in particular relating to motion of the vehicle 101. For example, collected data could include data concerning a vehicle 101 speed, acceleration, longitudinal motion, lateral motion, pitch, yaw, roll, braking, etc.

A memory of the computing device 105 may further store one or more control parameters. A control parameter generally governs use of collected data 104. For example, a parameter may provide a threshold to which calculated collected data may be compared to determine whether an adjustment should be made to the component. Similarly, a parameter could provide a threshold below which an item of collected data, e.g., a datum from an accelerometer, should be disregarded.

The system 100 includes the network 110. The network 110 represents one or more mechanisms by which the computing device 105 may communicate with a user device 125 and/or a traffic parameter server 130. Accordingly, the network 110 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

One or more user devices 125 (a single device 125 being shown in FIG. 1 for ease of illustration) may be connected to the network 110. The user devices 125 may include commonly-carried devices such as one or more of cellular telephones, tablet devices, laptop computers, etc.

The system 100 includes the traffic parameter server 130 having a data store 135. The traffic parameter server 130 collects traffic light parameter data, e.g., collected data 104 from a vehicle 101, a data collector 115, etc., sent over the network 110. The traffic parameter server 130 and the data store 135 may be of any suitable type, e.g., hard disk drives, solid-state drives, or any other volatile or non-volatile media. The data store 135 stores the traffic light parameter data collected by the traffic parameter server 130.

Figure 5:
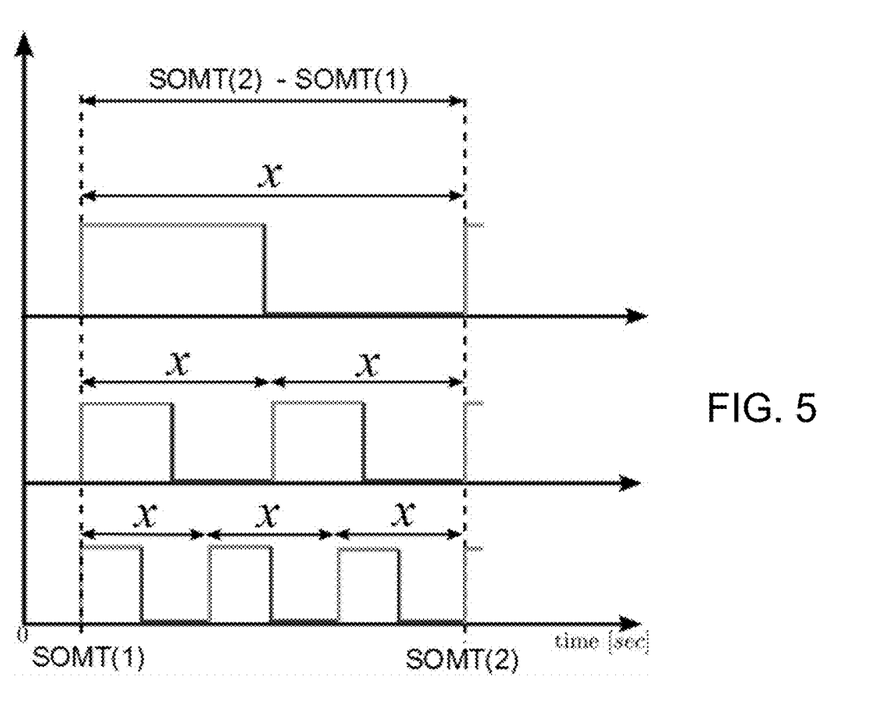
FIG. 5 is an exemplary chart showing several stoplight cycles from one set of measurements.

The system 100 includes the data collector 115. The data collector 115 may be placed at an intersection and/or on a traffic light. The data collector 115 measures the start of motion time (SOMT) for a vehicle 101 at an intersection. The SOMT may be used to generate an SOMT data set at the server 130. As shown in FIG. 5, the SOMT data set may include one or more stoplight cycles, e.g., green-yellow-red-green.

Figure 2:
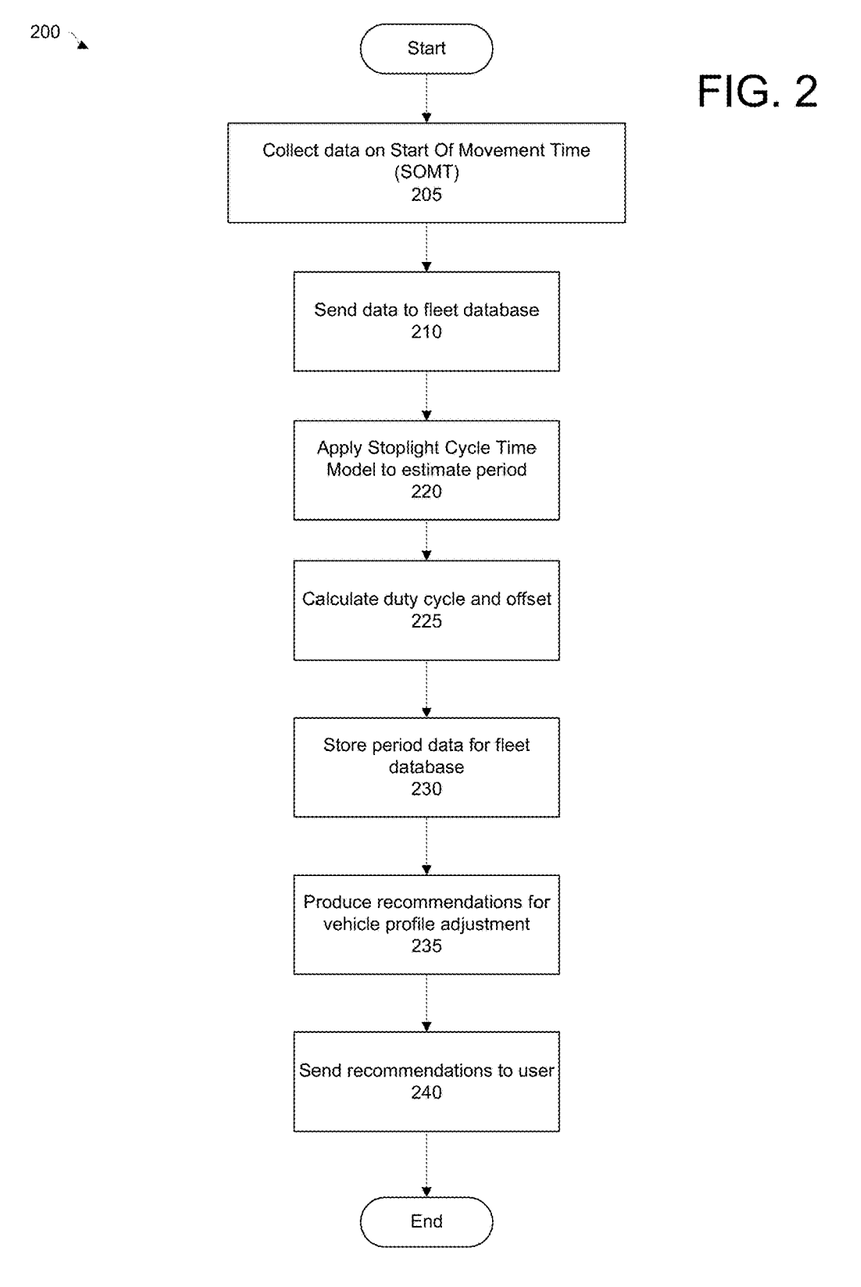
FIG. 2 is a process flow diagram of a process for estimating traffic parameters.

FIG. 2 illustrates a process 200 for using the system 100. The process 200 begins in a block 205, in which the data collectors 103, 115 collect SOMT data for vehicles 101. Specifically, the data collectors 103, 115 detect a status change of an ith vehicle: when the vehicle comes to a stop, this time is recorded, denoted herein as $t_r(i)$. When the vehicle starts moving again, a re-start time is recorded, denoted herein as $t_g(i)$. A traffic light passing time is collected, denoted herein by $t_p(i)$ and a heading, e.g., direction of travel, of the vehicle, is recorded, denoted herein as $h(i)$.

Next, in a block 210, the data collectors 103, 115 send the SOMT data to the traffic parameter server 130. By using data collectors on both traffic lights and in vehicles 101, a greater volume of useful data than would otherwise be possible may be collected and sent to the traffic parameter server 130. The SOMT data may be clustered by heading directions of vehicles from which it was collected (e.g., data from southbound vehicles may be stored together, data from north bound vehicles may be stored together, etc.), and may be arranged chronologically.

Figure 3:
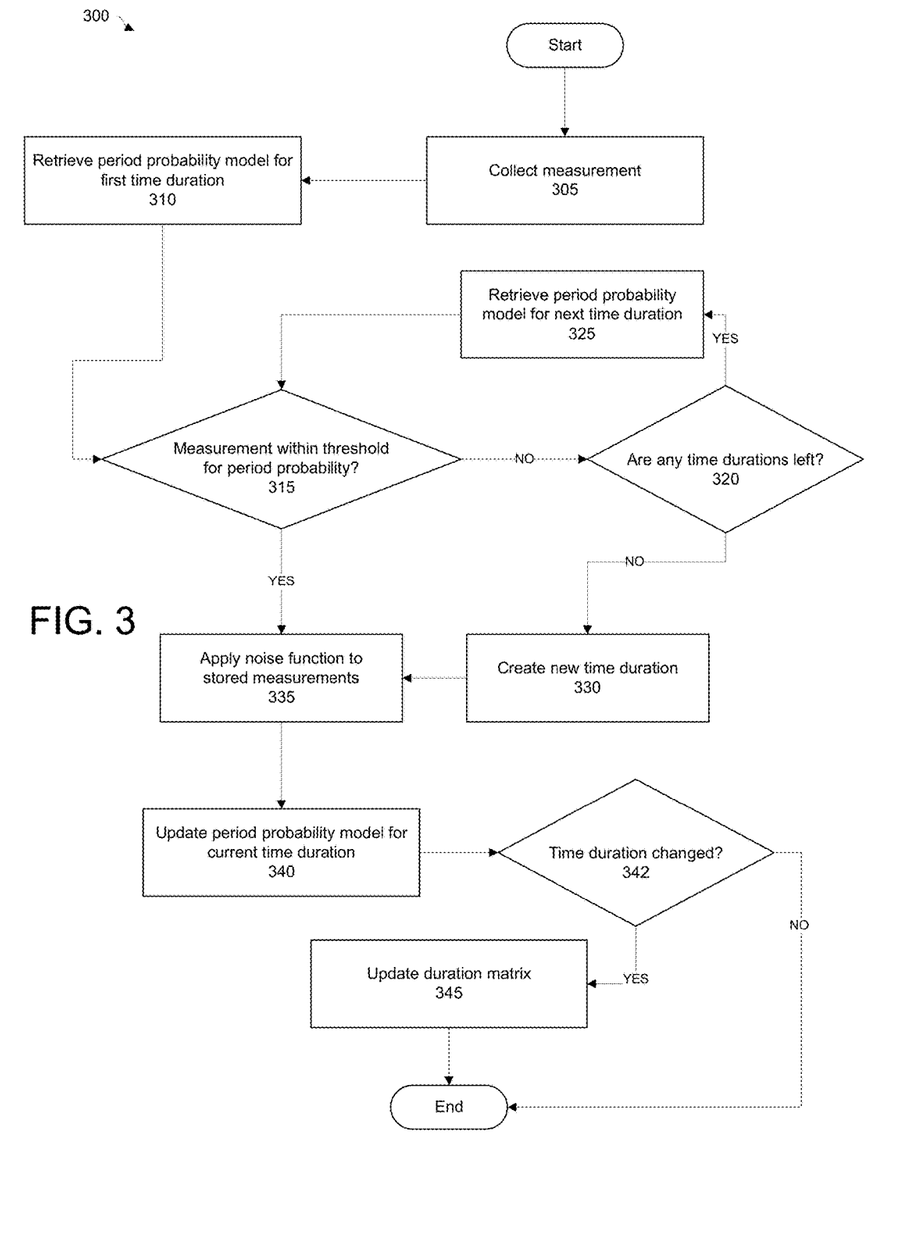
FIG. 3 is a process flow diagram of a process for estimating a stoplight cycle time.
Figure 4:
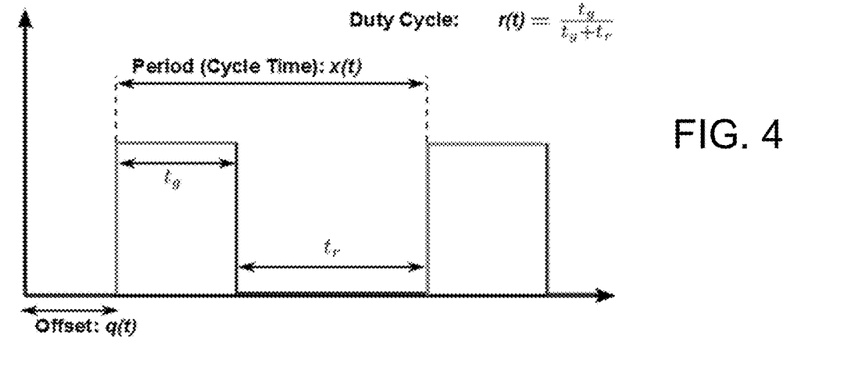
FIG. 4 is an exemplary diagram of the stoplight cycle time, a duty cycle, and an offset.

Next, in a block 220, the traffic parameter server 130 applies the Stoplight Cycle Time Model, described in process 300 of FIG. 3, to the data and generates an estimated stoplight cycle time.

Next, in a block 225, the traffic parameter server 130 calculates a duty cycle and an offset based on the estimated stoplight cycle time of the block 220 (and the process 300). The offset ρ of the stoplight is the difference in time between the end of one set of stoplight cycle times and another set of stoplight cycle times, and is determined with a modulus operation applied on green light time over total cycle time:

$$\rho(k) = \mathrm{mod}(\min(t_{g,u}^{i,o}), x(k))$$

A result of the foregoing equation may be prone to error; therefore, a linear drift term γ is iteratively calculated:

$$\gamma_{l,o} = \mathrm{mod}(\min(t_{g,u}^{i,o}),(\alpha+1)p^*) - \mathrm{mod}(\min(t_{g,w}^{i,o}), \alpha p^*)$$

where $p^*$ is the estimated stoplight cycle time. The duty cycle λ, which is the ratio of the amount of time spent at green light to the entire stoplight cycle time, may then be calculated:

$$\lambda(k) = \frac{\Delta T_g}{\Delta T_g + \Delta T_r}$$

where $\Delta T_g$ is the maximum time difference between the recorded $t_p$ times and the last green light on time that can be calculated with estimated values of ρ, p, and $\Delta T_r$, the maximum time difference between the stopping time $t_v$ of the incoming vehicles and the next green light on time. The total green and red times may be approximated by:

$$\Delta T_g \approx \Delta \overline{T}_g = \max(\mathrm{mod}(t_p(i) - \rho, p)) \text{ for } i=1 \ldots N_p$$

$$\Delta T_r \approx \Delta \overline{T}_r = p - \min(\mathrm{mod}(t_r(i) - \rho, p)) \text{ for } i=1 \ldots N_r$$

where $N_p$ and $N_r$ correspond to respective numbers of $t_p$ and $t_r$ measurements, described above.

Next, in a block 230, the traffic parameter server 130 stores the estimated period in the data store 135, producing a fleet data set.

Next, in a block 235, when a user requests stoplight cycle time data from the traffic parameter server 130, the traffic parameter server 130 produces recommendations for adjustment of the user's vehicle profile based on the location of the user's vehicle and the stoplight cycle time data. The recommendations may include changing the vehicle's operating speed, route to a destination, or acceleration based on an upcoming traffic light.

Next, in a block 240, the traffic parameter server 130 sends the recommendations to the user, and the process 200 ends.

FIG. 3 illustrates a process 300 describing the Stoplight Cycle Time Model of block 220 of FIG. 2. The process 300 starts in a block 305, in which a SOMT datum k is collected and provided to the server 130.

Next, in a block 310, the server 130 retrieves a period probability model for a first time duration:

$$x^i(k) = f_x^i(x^i(k-1) = x^i(k-1)$$

where $x^i(k)$ is the current period probability model for the current SOMT datum k retrieved in block 305, and $f_x^i(x^i(k-1))$ is the probability density function for the period of the previous datum k−1 given data up to datum k−1, and i is the current time duration index.

Next, in a block 315, the server 130 compares the datum k to the period estimation $x^i(k)$. The period estimation $x^i(k)$ produces a most likely estimation of the stoplight cycle time based on the current time duration index. If the measurement is not within a threshold of the most likely estimation of the stoplight cycle time, the process 300 moves to block 320.

Next, in the block 320, the server 130 checks to see if there are any more time duration indexes i. If there are more time duration indexes, the process 300 moves to a block 325.

Next, in the block 325, the server 130 retrieves the period probability model for the next time duration index i+1 and returns to block 315.

Referring back to block 320, if there are no more time duration indexes, the process 300 moves to a block 330. In the block 330, the server 130 creates a time duration index and initializes the new time duration index with an initial period probability model. The process 300 then moves to a block 335.

Referring back to block 315, if the datum k is within the threshold for the period probability for the current Markovian state, the process 300 moves to the block 335.

Figure 6:
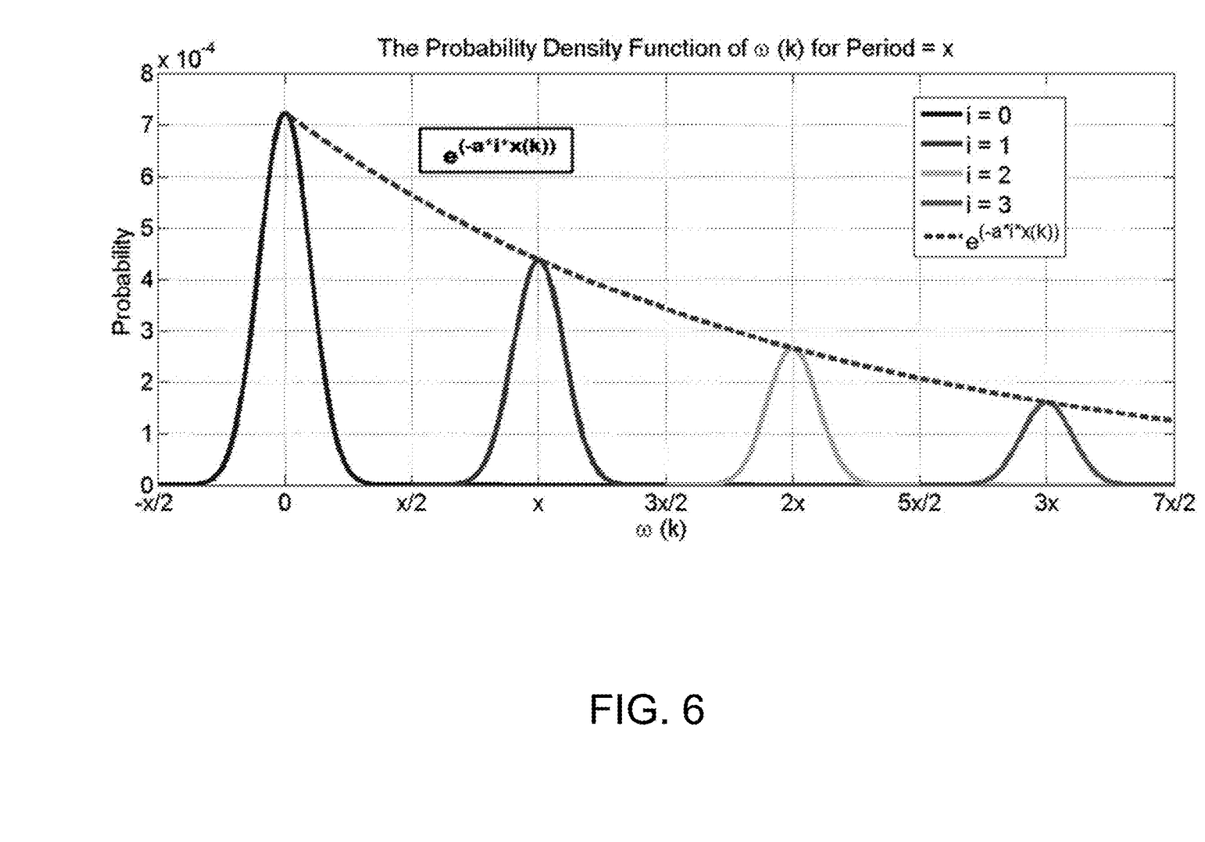
FIG. 6 is an exemplary chart of a noise function for determining the stoplight cycle time.

In the block 335, the server 130 stores the measurement and applies a noise function w(k) to the stored measurements. The noise function is a mixture of Gaussian noise applied to the measurement such that $$z(k)=x(k)+w(k)$$

where z(k) is the noise-adjusted period probability model. By applying the noise function to the measurement, the period x(k) can be estimated with fewer total measurements k. The probability density function of the noise function, shown in FIG. 6, is defined by $$f_w(w) = \frac{1}{\sqrt{2\pi\sigma^2}} \left( \frac{\sum_{i=0}^{N-1} e^{-\alpha i} \cdot e\left(-\frac{1}{2} \cdot \frac{w(k)-ip}{\sigma^2}\right)}{\sum_{j=0}^{N-1} e^{-\alpha j}} \right)$$

where σ is the standard deviation, α is the decaying coefficient of the Gaussian mixture, and N is the number of Gaussian Noises whose significance is decaying with increasing multiple of the period.

Next, in a block 340, the server 130 updates the period probability model. At this point, the probability model can be written as $$f_x(x(k)|z(1:k-1)) = \sum_{x(k-1)\in \mathbb{X}} f_x(x(k)|x(k-1)) \cdot f_x(x(k-1)|z(1:k-1))$$

from here, the new datum k is incorporated to update the period probability density function, $$f_x(x(k)|z(1:k)) = \frac{f_z(z(k)|x(k)) \cdot f_x(x(k)|z(1:k-1))}{\sum_{x(k)\in \mathbb{X}} f_z(z(k)|x(k)) \cdot f_x(x(k)|z(1:k-1))}$$

where $f_x(x(k)|z(1:k))$ denotes the probability density function of the estimated state at datum k given the measurements until k, $f_x(x(k)|z(1:k-1))$ is the output of the prior update stage and $f_z(z(k)|x(k))$ is the probability density function of the stochastic measurement model z(k).

Next, in a block 342, the server 130 checks if the time duration has changed, e.g., from the block 325 or the block 330. If the time duration has not changed, the process 300 ends. If the time duration has changed, the process 300 moves to a block 345.

Next, in the block 345, the server updates the time duration index matrix, which stores the length $d^i$ of each time duration index and the process 300 ends.

Computing devices such as those discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a computer including a processor and a memory, the memory storing instructions executable by the computer to:
   collect data about vehicle movement at a stoplight;
   determine a time of a start of motion of a vehicle at the stoplight from the collected data;
   predict a first stoplight cycle time with a first probability model of the stoplight cycle time based at least in part on the time of the start of motion of the vehicle, the probability model indicating a first range of probabilities of the first predicted stoplight cycle time;
   compare the collected data to the predicted stoplight cycle time to generate a second probability model, based on the first probability model, that specifies a second range of probabilities of a second predicted stoplight cycle time;

apply a noise function to the collected data to generate noise-applied data;

update the second probability model for the predicted stoplight cycle time by adjusting a set of probabilities of the second probability model with the noise-applied data to generate an updated second probability model;

predict the second predicted stoplight cycle time based on the adjusted set of probabilities;

predict an amount of time spent at a green light during the second predicted stoplight cycle time based on the second predicted stoplight cycle time;

predict a duty cycle for the stoplight that is a ratio of the predicted amount of time spent at the green light to the second predicted stoplight cycle time; and provide, via a network to at least one vehicle computer, a recommended vehicle operation based, at least in part, on the duty cycle.

2. The system of claim 1, wherein the recommended vehicle operation includes recommended driving patterns for reduced fuel usage.

3. The system of claim 2, wherein the recommended driving pattern includes a recommended operating speed determined so that a vehicle reaches the stoplight during a specified portion during the stoplight cycle time.

4. The system of claim 3, wherein the recommended driving pattern includes a route to a destination determined so that the vehicle reaches the stoplight at specified portions of the stoplight cycle time.

5. The system of claim 1, wherein the recommended vehicle operation is determined, at least in part, by the current time.

6. The system of claim 1, wherein the instructions further include instructions to send a notification with the recommended vehicle operation to a handheld user device.

7. The system of claim 1, wherein the instructions further include instructions to determine an offset for the stoplight based on the stoplight cycle time.

8. The system of claim 1, further comprising a data collector to collect the data on vehicle movement timing.

9. The system of claim 1, wherein the stoplight cycle time is determined, at least in part, by the vehicle movement timing data.

10. The system of claim 1, wherein the probability model is one of a plurality of probability models, each probability model being configured to predict the stoplight time for a specific time range during a day.

11. The system of claim 10, wherein the instructions further include instructions to, if after comparing the data to the predicted stoplight cycle time, the data are not within a threshold of the predicted stoplight time, select the next of the plurality of probability models, predict the stoplight cycle time with the probability model, and compare the data to the new predicted stoplight cycle time.

12. The system of claim 11, wherein the instructions further include instructions to, if none of the plurality of probability models generate a predicted stoplight time for which the data fall within the threshold, generate a new probability model and append to the plurality of probability models.

13. A method, comprising:

collecting data about vehicle movement at a stoplight;

determining a time of a start of motion of a vehicle at the stoplight from the collected data;

predicting a first stoplight cycle time with a first probability model of the stoplight cycle time based at least in part on the time of the start of motion of the vehicle, the probability model indicating a first range of probabilities of the first predicted stoplight cycle time;

comparing the collected data to the predicted stoplight cycle time to generate a second probability model, based on the first probability model, that specifies a second range of probabilities of a second predicted stoplight cycle time;

applying a noise function to the collected data to generate noise-applied data;

updating the second probability model for the predicted stoplight cycle time by adjusting a set of probabilities of the second probability model with the noise-applied data to generate an updated second probability model;

predicting the second predicted stoplight cycle time based on the adjusted set of probabilities;

predicting an amount of time spent at a green light during the second predicted stoplight cycle time based on the second predicted stoplight cycle time;

predicting a duty cycle for the stoplight that is a ratio of the predicted amount of time spent at the green light to the second predicted stoplight cycle time; and providing, via a network to at least one vehicle computer, a recommended vehicle operation based, at least in part, on the duty cycle.

14. The method of claim 13, wherein the recommended vehicle operation includes recommended driving patterns for reduced fuel usage.

15. The method of claim 14, wherein the recommended driving pattern includes a recommended operating speed determined so that a vehicle reaches the stoplight during a specified part of the stoplight cycle time.

16. The method of claim 15, wherein the recommended driving pattern includes a route to a destination determined so that the vehicle reaches the stoplights at specified parts of the stoplight cycle time.

17. The method of claim 13, further comprising determining an offset for the stoplight based on the stoplight cycle time.

18. The method of claim 13, wherein the probability model is one of a plurality of probability models, each probability model being configured to predict the stoplight time for a specific time range during a day.

19. The method of claim 13, wherein the stoplight cycle time is determined, at least in part, by the vehicle movement timing data.

20. The method of claim 13, wherein the probability model is one of a plurality of probability models, each probability model being configured to predict the stoplight time for a specific time range during a day.

* * * * *